United States Patent [19]
Jacobs

[11] 3,757,961
[45] Sept. 11, 1973

[54] ARTICLE TRANSFER APPARATUS

[75] Inventor: Orville W. Jacobs, Ludlow Falls, Ohio

[73] Assignee: The East Dayton Tool & Die Company, Dayton, Ohio

[22] Filed: Jan. 10, 1972

[21] Appl. No.: 216,392

[52] U.S. Cl. .............................. 214/1 BB, 198/218
[51] Int. Cl. ........................................... B65g 25/04
[58] Field of Search ................... 214/1 BB; 198/218

[56] References Cited
UNITED STATES PATENTS

| | | | |
|---|---|---|---|
| 3,432,042 | 3/1969 | Bautz | 214/1 BB |
| 3,456,814 | 7/1969 | Bautz | 214/1 BB |
| 3,521,760 | 7/1970 | Wallis | 214/1 BB |
| 3,430,779 | 3/1969 | McElroy | 214/1 BB |
| 3,227,290 | 1/1966 | Lemelson | 214/1 CM |

Primary Examiner—Gerald M. Forlenza
Assistant Examiner—George F. Abraham
Attorney—William R. Jacox et al.

[57] ABSTRACT

A series of articles are successively advanced in a step-by-step manner along a linear path by a transfer unit which includes a plurality of gripping members supported by parallel-spaced arms. The arms are supported for lateral movement relative to an elongated carriage which is supported for longitudinal movement. The arms are reciprocated as a unit by corresponding racks which engage pinions mounted on a splined shaft extending longitudinally of the carriage. The shaft is movable axially within a gear driven by a reversible stepping motor controlled by a pre-set control unit which also synchronously controls a reversible stepping motor for reciprocating the carriage. The control unit includes decade counters which may be adjustably set for precisely selecting the corresponding limits of longitudinal movement of the carriage and lateral movement of the arms and gripping members.

8 Claims, 6 Drawing Figures

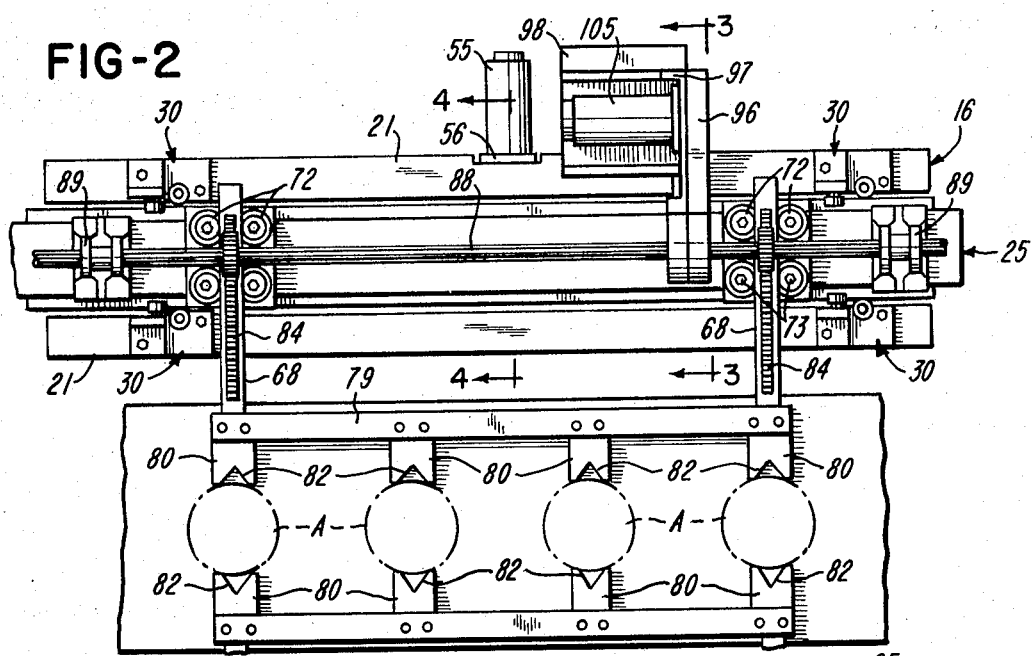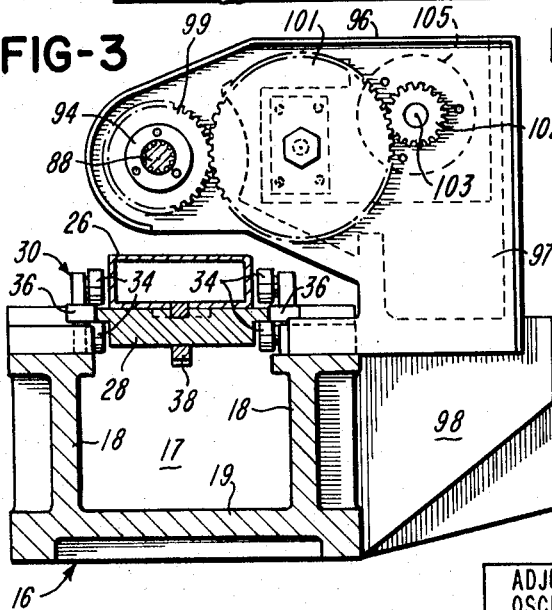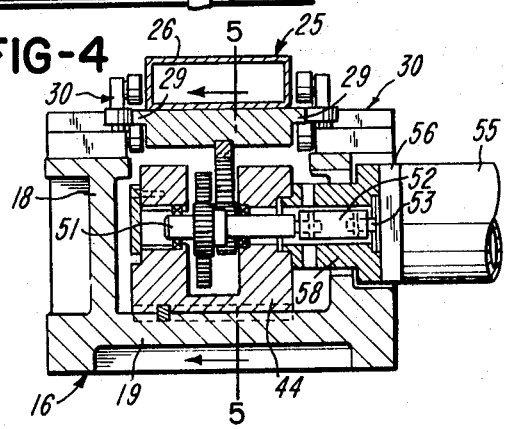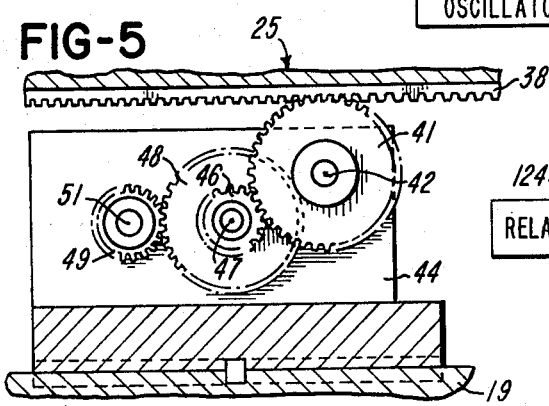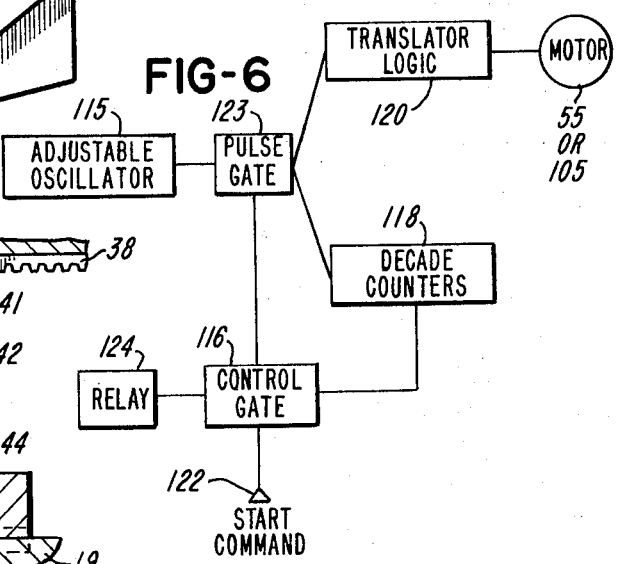

ARTICLE TRANSFER APPARATUS

BACKGROUND OF THE INVENTION

This invention relates generally to the form of article transfer apparatus or device disclosed in applicant's U. S. Pat. No. 3,025,731 which issued on Mar. 20, 1962. Such a transfer device is particularly suited for successively advancing workpieces between the dies of a punch press, but may be used for advancing other forms of articles along a linear path to locate each article at a series of stations where successive operations are performed on the article.

When the transfer device shown in the above patent is used in conjunction with a punch press, the transfer device is connected by a rod to the ram of the punch press so that the transfer device is mechanically operated in response to the reciprocating motion of the punch or ram. As a result of this mechanical connection, only a portion of the ram stroke can be used for transferring or advancing each workpiece between the dies on the press. That is, each workpiece must usually be transferred or advanced quickly during the upstroke of the ram, thus limiting the distance which the article can be transferred and also usually requiring rapid acceleration and deceleration of the workpiece so that it is difficult to obtain advancement of each workpiece in precise predetermined increments. It is therefore desirable to provide a transfer apparatus without these operating limitations.

It is also desirable for such a transfer apparatus to provide for conveniently and precisely adjusting the limits of movement of the members which grip the workpieces or articles, both in a direction laterally to the desired path of the articles and in a direction parallel to the path of the articles. That is, convenient and precise lateral adjustment of the gripping members provides for quickly receiving and accommodating articles of various sizes, and convenient and precise adjustment of the longitudinal movement of the gripping members provides for quickly selecting the distance of step-by-step advancement of each article along the path.

SUMMARY OF THE INVENTION

The present invention is directed to an improved apparatus for successively transferring one or more articles in a step-by-step manner along a predetermined path and which not only provides the desirable features mentioned above, but also provides substantial durability so that the apparatus may be used for an extended period of service without requiring a shutdown for maintenance. More specifically, the transfer apparatus of the invention provides for moving or transferring each article with a smooth and gradual acceleration and deceleration at each limit of movement and further provides for advancing or transferring each article in incremental steps of substantial distance. The transfer device is also adaptable for use in successively transferring each article between a series of presses or machines or between a series of other stations where successive operations are performed on each article. Furthermore, the transfer apparatus of the invention provides for using the maximum time available for successively advancing each article and does not require that the transfer or advancement be completed before the ram of a punch press starts its downward or extended stroke.

In accordance with the disclosed embodiment of the invention, the above features and advantages are generally provided by a transfer apparatus which includes an elongated carriage supported by a base frame for longitudinal movement. A pair of parallel-spaced arms are supported by the carriage for lateral movement relative to the carriage, and the arms support a series of article gripping fingers or members. A rack is mounted on each arm and engages a corresponding pinion mounted on a splined shaft extending longitudinally of the carriage. The splined shaft is movable axially within a gear driven by a reversible synchronous stepping motor controlled from a remote control unit which provides for conveniently selecting the number of steps made by the stepping motor in each direction of rotation.

The control unit also provides for selecting the number of steps made by another reversible synchronous stepping motor which reciprocates the carriage through a series of gears driving a rack mounted on the bottom of the carriage. Thus the control unit provides for operating the stepping motors in synchronism and for precisely selecting the limits of the movements of the gripping members in both a longitudinal direction and in a lateral direction relative to the desired path for the articles.

Other features and advantages of the invention will be apparent from the following description, the accompanying drawings and the appended claims.

BRIEF DESCRIPTION OF THE DRAWINGS

FIG. 2 is a plan view of a portion of the apparatus shown in FIG. 1;

FIG. 3 is a vertical section taken generally on the line 3—3 of FIG. 2;

FIG. 4 is a vertical section taken generally on the line 4—4 of FIG. 2;

FIG. 5 is a vertical section taken generally on the line 5—5 of FIG. 4; and

FIG. 6 is a schematic electrical control circuit used for controlling each of the drive motors on the transfer apparatus shown in FIGS. 1 and 2.

DESCRIPTION OF THE PREFERRED EMBODIMENT

Figure 1:
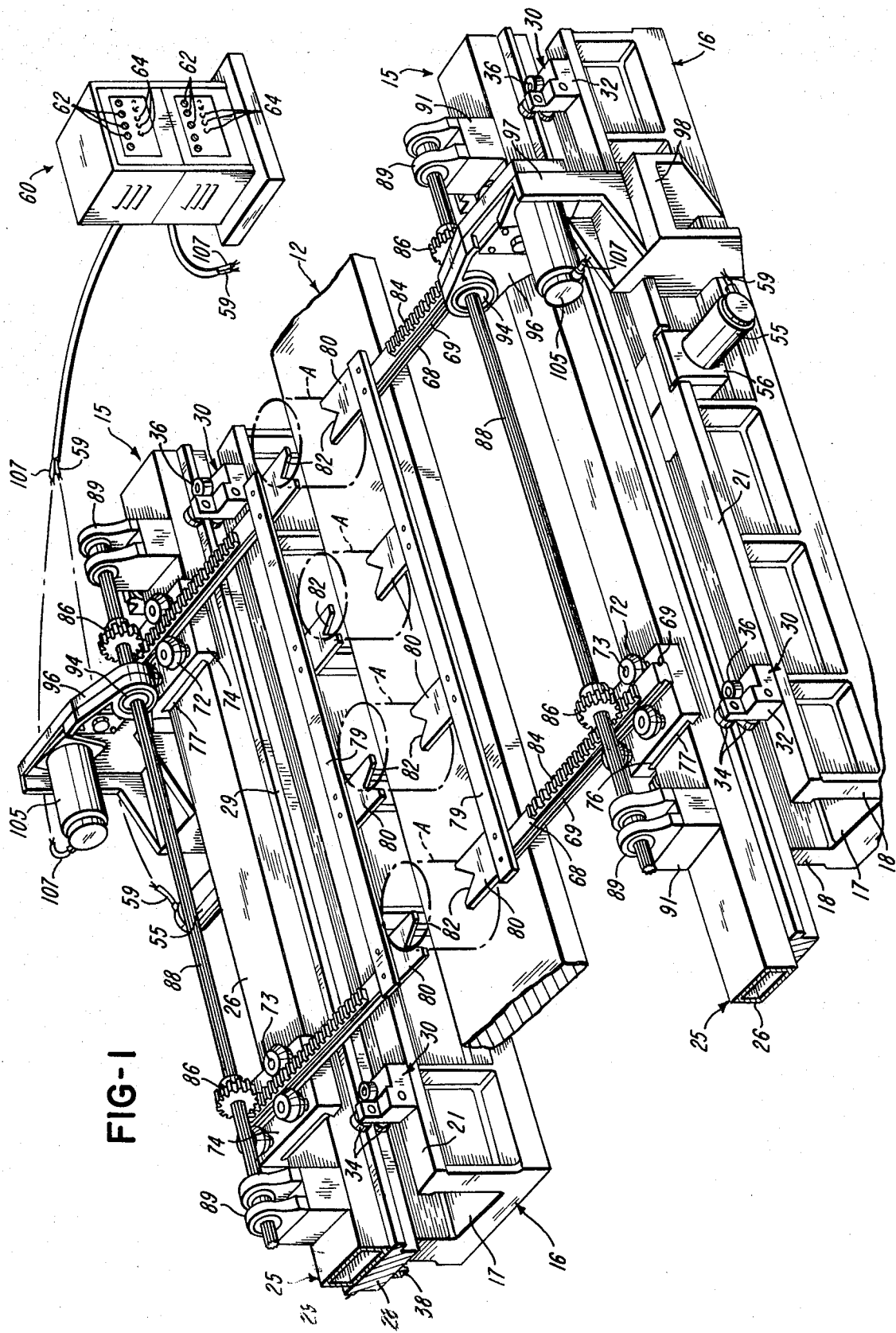
FIG. 1 is a perspective view of an article transfer apparatus constructed in accordance with the invention.

The transfer apparatus disclosed in FIGS. 1 and 2 is particularly suited for successively transferring a series of articles A along a linear path on the upper surface of an elongated platform or table 12. For purposes of simplified illustration, the articles A are represented as cylindrical objects. However, it is to be understood that the articles A may be of any configuration. The transfer apparatus includes a set of transfer units 15 which are positioned in generally parallel opposed relation on opposite sides of the table 12 and the linear path for the articles A. Since the transfer units 15 are of symmetrical construction, only one of the transfer units will be described in detail.

Thus, each of the transfer units 15 includes an elongated cast or fabricated metal base frame 16 having a generally U-shaped cross-sectional configuration and defining an elongated trough-like chamber 17 therein. The frame is formed by a set of opposing side walls 18 rigidly connected by a base wall 19, and each of the side walls 18 includes a flat upper surface 21.

An elongated carriage 25 is supported for longitudinal movement by the base frame 16 and includes an aluminum tubular portion 26 having a rectangular cross-sectional configuration. The tubular portion 26 is rigidly secured to a generally rectangular solid aluminum bar portion 28 having a pair of ribs or rails 29 projecting outwardly from the opposite edges of the bar portion 28. The carriage rails 29 are engaged by a set of roller units 30 mounted on the upper surfaces 21 of the frame side walls 18. Each of the units 30 includes a base block 32 which supports a pair of rollers 34 (FIG. 3) positioned above and below the corresponding rail 29 of the carriage 25. A third roller 26 is also supported by each of the blocks 32 and is positioned to engage the outer surface of the corresponding rail 29. The rollers 34 and 36 incorporate antifriction bearings (not shown) and cooperate to support the carriage 25 for smooth longitudinal movement with the minimum of friction.

An elongated rack 38 (FIG. 4) extends longitudinally of the carriage 25 and is partially recessed within a longitudinally extending slot formed in the bottom surface of the solid bar portion 28 of the carriage 25. The rack 38 is engaged by a gear 41 (FIG. 5) mounted on a shaft 42 supported by a U-shaped bracket 44 positioned within the chamber 17. The gear 41 is driven by a pinion 46 mounted on a shaft 47 which supports another gear 48 driven by another pinion 49. The pinion 49 is mounted on a shaft 51 which is connected by a flexible coupling 52 (FIG. 4) to the output shaft 53 a synchronous stepping motor 55. The motor 55 has a flange 56 which is secured to a tubular support member 58 projecting from the bracket 44, as shown in FIG. 4. One form of stepping motor 55 which has provided satisfactory results is manufactured by the Superior Electric Company and sold under the trademark Slo-Syn. The specific motor used produces an output torque of 400 ounce-inches and requires 200 pulses or steps to produce one revolution of the output shaft.

The stepping motor 55 is connected by a power supply line 59 to a remote electronic control unit 60 which includes a series of components as will be explained later. The control unit 60 is preset by positioning a series of control knobs 62 which are calibrated to produce movement of the carriage 25 for a predetermined distance in steps or increments of 0.010 inch. A set of control buttons 64 is positioned under the control knobs 62 and provide for selecting on-off, jogging and continuous running operations of the stepping motor 55.

The carriage 25 supports a pair of elongated arms 68 each having longitudinally extending V-shaped grooves 69 formed within its edge surfaces. The grooves 69 within each arm 68 receive a set of correspondingly shaped rollers 72 each of which is supported by an anti-friction bearing (not shown) mounted on a shaft 73 projecting upwardly from a base pad 74. Each of the pads 74 has a dovetail way 76 which adjustably receives a corresponding mating plate 77 rigidly secured to the flat upper surface of the carriage 25. Thus the rollers 72 provide for movement of the arms 68 laterally with respect to the carriage 25. A bar 79 rigidly connects the inwardly projecting end portions of the arms 68 and also supports a series of gripping members 80 each having a V-shaped notch 82 for receiving one of the articles A.

An elongated rack 84 is secured to the upper surface of each of the arms 68 and is engaged by a corresponding gear or pinion 86 mounted on a splined shaft 88 extending longitudinally of the carriage 25. The end portions of the shaft 88 are rotatably supported by corresponding sets of bearings 89 mounted on blocks 91 which are rigidly secured to the upper surface of the carriage 25. Thus rotation of the shaft 88 is effective to produce lateral movement of the gripping members 80 as a unit relative to the carriage 25.

Referring to FIGS. 1–3, an anti-friction bearing 94 is mounted on the shaft 88 between the pinions 86 and includes a series of balls (not shown) which project into the grooves defined between the splines on the shaft 88 so that the shaft 88 rotates with the bearing 94 but is free to move axially within the bearing 94. The bearing 94 is rotatably supported by an arm 96 which is rigidly secured to a bracket 97 mounted on an extension member 98 of the base frame 16.

A gear 99 (FIG. 3) is secured to the bearing 94 and engages a transfer gear 101 rotatably supported by the arm 96. The gear 101 is driven by a pinion 102 mounted on the output shaft 103 of another synchronous stepping motor 105 constructed substantially the same as the stepping motor 55 and mounted on the arm 96. An electrical power supply line 107 connects the stepping motor 105 to the control unit 60 which incorporates another set of control knobs 62 and push buttons 64 for precisely selecting the rotation of the output shaft 103 of the stepping motor 105 in both forward and reverse directions. As mentioned above, each of the motors 55 and 105 requires 200 pulses or steps for each revolution of its output shaft and is adapted to receive 3,000 steps per second so that it will operate at 900 revolutions per minute. The corresponding motors 55 and 105 of the opposing transfer units 15 are connected to the control unit 60 for synchronous operation.

Referring to FIG. 6 the control unit 60 incorporates a control circuit for each set of the stepping motors 55 or 105. The basic elements of the circuit include an adjustable frequency oscillator 115, control gates 116, decade counters 118 and a pulse-to-step translator logic circuit 120. The decade counters 118 are set by the control knobs 62. A start command signal is introduced at 122, for example, from a switch actuated by the movement of the ram of a punch press. This start signal causes the gate circuits to pass pulses from the oscillator 115 through a pulse gate 123 to the decade counters 118 and to the translator logic circuit 120. The translator logic circuit 120 converts the pulses into the switching sequence required to rotate the output shaft of one set of motors 55 or 105. When the preselected count is completed, the control gate 116 turns off the pulse gate 123 and actuates a relay 124 which supplies the start command pulse to the control circuit for the other set of motors 55 or 105.

After the size of the articles A and the desired distance of advancement are determined, the control knobs 62 on the control unit 60 are set according to the desired limits of lateral movement of the gripping members 80 and of longitudinal movement of the carriages 25. When the start signal is received, the motors 105 are actuated for the preselected count to extend the gripping members 80 inwardly to engage the corresponding articles A on the support table 12. The motors 55 are then automatically energized to advance the carriages 25 by the desired distance which corresponds to the spacing between the adjacent gripping members 80. The stepping motors 105 are then operated in a reverse direction to retract the gripping members 80 from the articles A, after which the stepping motors 55 are actuated in a reverse direction to retract the carriages 25 to their starting or home positions. When the next start signal is received, this sequence of operation is repeated so that the gripping members 80 move in a rectangular path in timed relation with the operation of the device which produces the start signal.

From the drawings and the above description, it is apparent that an article transfer apparatus constructed in accordance with the present invention, provides several desirable features and advantages. For example, one important feature is provided by the control of the movement of the gripping members 80 by the stepping motors 55 and 105 and the control unit 60. This control system provides for using the maximum time available for advancing the articles and also provides for smooth acceleration and deceleration at the beginning and at the end of each stroke of movement of the gripping members 80. Thus when the transfer apparatus is being used in conjuntion with a punch press, it is no longer necessary to complete the transfer or advancement of the articles before the ram of the punch press begins its downward stroke.

The control system also provides for conveniently and precisely adjusting the limits of movement of the gripping members 80 for accommodating articles of various configurations and sizes and for precisely selecting the distance of advancement of each article. That is, the limits of inward movement of the gripping members 80 and the travel of the carriages 25 may be conveniently adjusted in increments of 10, 1, 0.100 or 0.010 inches merely by adjusting one or more of the control knobs 62. The spacing between the gripping members 80 on the bars 79 may also be quickly changed simply by shifting the gripping members on each bar. It is also apparent that the transfer apparatus provides for moving the carriages 25 through long strokes by increasing the count of the decade counter 118 which supplies the pulses to the stepping motors 55.

While the form of transfer apparatus herein described constitutes a preferred embodiment of the invention, it is to be understood that the invention is not limited to this precise form of apparatus, and that changes may be made therein without departing from the scope and spirit of the invention. For example, it is apparent that one of the transfer units 15 may be replaced by a simple rail which extends along the platform or table 12 parallel to the movement of the carriage 25 of the other transfer unit 15. The articles A would then be merely slid along the rail in a step-by-step manner by the gripping members 80 of the single transfer unit 15.

It is also within the scope of the invention to replace the stepping motors 55 with hydraulic rotary motors which are supplied with hydraulic fluid from a pump and to use electrical stepping motors for operating control valves within the hydraulic fluid supply lines extending from the hydraulic pump to the hydraulic motors. This form of drive and control system provides a substantially higher horsepower for driving the gears 41 and is desirable for reciprocating carriages 25 having substantial mass. It is also apparent that a plurality of transfer units 15 may be arranged in tandem relation between a series of machines and controlled from a single control unit 60 when it is desired to successively advance a series of articles from one machine to the next.

The invention having thus been described the following is claimed:

1. Apparatus for transferring at least one article in a step-by-step manner along a predetermined path, comprising an elongated carriage, frame means supporting said carriage for longitudinal movement, gripper means adapted to engage the article, a set of parallel spaced elongated arms supporting said gripper means, means mounted on said carriage and supporting said arms for longitudinal movement to effect lateral movement of said gripper means relative to said carriage, a longitudinally extending splined shaft supported by said carriage, gear means for moving said arms longitudinally in response to rotation of said shaft, a rotary drive member mounted on said shaft, said shaft being movable axially within said drive member, a first electrical stepping motor mounted on said frame means and having an output shaft, means for rotating said drive member in response to rotation of said output shaft of said first stepping motor to effect gripping and releasing of the article, an elongated longitudinally extending rack secured to said carriage, a second electrical stepping motor mounted on said frame means and having an output shaft, means for driving said rack in response to rotation of said output shaft of said second stepping motor for reciprocating said carriage to effect intermittent successive advancement of the article after it has been gripped, means for producing electrical pulses for each of said stepping motors and for actuating said stepping motors in synchronism, and control means for independently selecting the number of pulses supplied to each of said stepping motors for conveniently and precisely adjusting the limits of movement of said carriage and said gripper means.

2. Apparatus as defined in claim 1 wherein said drive member includes external gear teeth, and said means for rotating said drive member in response to rotation of said output shaft of said first stepping motor, comprised a set of gears connecting said output shaft of said stepping motor to said drive member.

3. Apparatus as defined in claim 1 wherein said means for driving said rack in response to rotation of said output shaft of said second stepping motor, comprise a set of gears connecting said output shaft of said second stepping motor to said rack.

4. Apparatus as defined in claim 1 wherein said pulse producing means include an adjustable frequency oscillator, said control means include a set of pulse counters, a pulse-to-step translator logic circuit, and means responsive to an electrical start signal for controlling the transfer of pulses from said oscillator to said counters and said logic circuit.

5. Apparatus as defined in claim 1 wherein said gear means includes a pinion on said splined shaft for each said arm, an elongated rack mounted on each said arm and engaging the corresponding said pinion, and said member is mounted on said shaft between said pinions.

6. Apparatus as defined in claim 1 wherein said carriage includes outwardly projecting and longitudinally extending parallel side rails, and said supporting means for said carriage include a series of rollers engaging each of said rails.

7. An article transfer device including a pair of said apparatus as defined in claim 1 and arranged in opposed relation, and said control means is connected to actuate the corresponding said stepping motors in synchronism.

8. Apparatus for transferring at least one article in step-by-step manner along a predetermined path, comprising an elongated carriage, frame means supporting said carriage for longitudinal movement, gripper means adapted to engage the article, a set of parallel spaed elongated arms supporting said gripper means, means mounted on said carriage and supporting said arms for longitudinal movement to effect lateral movement of said gripper means relative to said carriage, a longitudinally extending splined shaft supported by said carriage, gear means for moving said arms longitudinally in response to rotation of said shaft, a rotary drive gear mounted on said shaft between said arms, said shaft being movable axially within said drive member, bracket means mounted on said frame means and supporting said drive gear for rotation, a first electrical reversible stepping motor mounted on said bracket means and having an output shaft, gear means connecting said drive gear to said output shaft of said first stepping motor to effect gripping and releasing of the article, an elongated longitudinally extending rack secured to said carriage, a second electrical reversible stepping motor mounted on said frame means and having a shaft, gear means connecting said rack to said output shaft of said second stepping motor for reciprocating said carriage to effect intermittent successive advancement of the article after it has been gripped, means for producing electrical pulses for each of said stepping motors and for actuating said stepping motors in synchronism, means for counting the pulses, and control means for independently selecting the number of counted pulses supplied to each of said stepping motors for conveniently and precisely adjusting the limits of movement of said carriage and said gripper means.

* * * * *